United States Patent Office 2,837,489
Patented June 3, 1958

2,837,489

PROCESS FOR PREPARATION OF CONDENSATION PRODUCTS OF CARBOHYDRATES, SULFUROUS ACID OR ITS DERIVATIVES, FORMALDEHYDE, AND PHENOL

Richard Alles, Ludwigshafen (Rhine), Germany, assignor to Badische Anilin- & Soda-Fabrik Aktiengesellschaft, Ludwigshafen (Rhine), Germany No Drawing. Application May 23, 1955, Serial No. 510,580. In Germany August 24, 1949

Public Law 619, August 23, 1954
Patent expires August 24, 1969

7 Claims. (Cl. 260—17.2)

This invention relates to novel condensation products of a carbohydrate, sulfurous acid or a derivative thereof, formaldehyde, and a phenol, and to processes of manufacturing said compounds.

It is an important object of this invention to provide novel tanning agents having a constitution similar to tannin but, in contrast thereto, being non-hydrolyzable.

A further object of the invention is to provide a process of manufacturing condensation products of carbohydrates, preferably sugars such as mono- or bisaccharides, with sulfurous acid or its water-soluble salts, especially bisulfites or mixtures of sulfurous acid and sulfites, and with formaldehyde and phenols.

Among other objects of this invention are the provision of pharmaceuticals, disinfectants and preserving agents obtained by the said condensation reaction.

These and other objects, advantages and functions will be apparent from the more detailed description of the invention.

In accordance with this invention, I have found that valuable water-soluble condensation products containing carbinol groups and sulfonic acid groups are obtained if a carbohydrate, sulfurous acid or a water-soluble salt thereof, especially a bisulfite, are condensed with formaldehyde and a phenol. The phenols to be used according to this invention should be free from sulfonic acid groups.

The carbohydrate can be, for example, d-glucose, saccharose, formose and any other natural or synthetic sugar, or functional derivatives thereof, such as acetonated, methylated and esterified sugars, glucosides, amino sugars and methylmonoses, such as rhamnose. Examples of suitable salts of sulfurous acid are the alkali metal and the ammonium salts of sulfurous acid. The term "a phenol" includes simple unsubstituted mono- and polyhydric phenols such as phenol, cresol, resorcinol and halogenated phenols, nitrophenols, and carboxylated phenols, for example, salicylic acid.

According to this invention there are obtained high molecular weight compounds having tanning action, which are water-soluble, and which in their constitution are to a great extent analogous to tannin (the typical member of the class of hydrolyzable tanning agents). Thus, in the new compounds, the individual members of a long carbon chain are linked to hydroxy aryl groups. The new compounds differ in that they are not connected with the carbon atoms by oxygen bridges, but the linkages are through methylene bridges, and the hydrophilic alcohol groups remain intact. In use, therefore, the tanning agents obtainable according to this invention have the advantage over the natural tanning agents of the tannin class that they are not hydrolyzable. When monosaccharides are used as initial materials, the products contain one aliphatically-combined sulfonic acid group, and the condensation products produced from polysaccharides may have one or more aliphatic sulfonic acid groups.

For example, by using d-glucose or d-fructose, condensation products containing both sulfonic acid groups and carbinol groups are obtained having the following formulae, R being a hydroxyaryl, preferably a hydroxy phenyl radical. The constitution of tannin is also given for purposes of comparison, R' being a gallic acid or digallic acid radical.

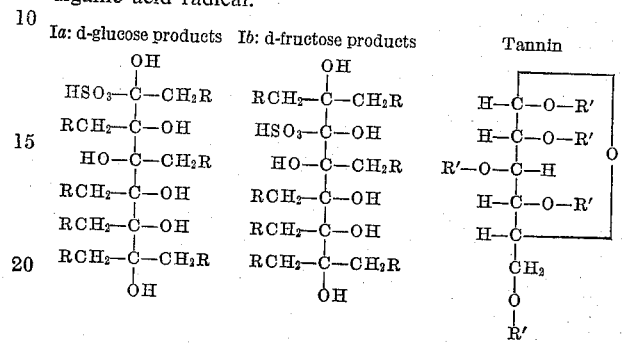

As may be seen from these formulae, not only are the active hydrogen atoms of the secondary carbon atoms of the sugars replaced, but also the hydrogen atom of the carbonyl carbon atom (glucose) activated by the SO₃H— groups is replaced, and the hydrogen atoms of the primary terminal carbon atoms are replaced. Apparently, the hydrogen atoms of the primary carbon atoms are so strongly activated by the strong loading of the whole molecule with negative radicals that they react with phenol alcohols.

The reaction of the sulfurous acid or a salt thereof, monosaccharides and the sugar-like di- and polysaccharides with formaldehyde and phenols may be carried out in alkaline medium in various ways. A neutral or acid medium will be inefficient in this case, because the hydrogen atoms attached to the carbon atoms which are not adjacent to the sulfonic acid group are not activated in a sufficient degree in a neutral or acid medium. For example, a water-soluble phenol alcohol may first be prepared from phenol and formaldehyde in known manner, and the alcohol may then be reacted with a sugar and sulfurous acid or a salt thereof in an alkaline medium. In addition to the simple phenols, substituted phenols, such as chlorphenols and nitrophenols, may be reacted with formaldehyde to give the corresponding methylol compounds. Instead of the simple methylol compounds, highly condensed phenol resins which are no longer soluble in water may also be used. The reaction may also be carried out in an alkaline solution of a sugar, a sulfite, a phenol, and formaldehyde. The molar ratio of sugar to formaldehyde and phenol necessary in the condensation depends on the number of the hydrogen atoms which are to be replaced by an arylmethyl group. Principally speaking all hydrogen atoms attached to a carbon atom bearing a hydroxyl groulp are exchangeable. In this manner up to 7 arylmethyl groups can be introduced into glucose per each molecule and up to 14 arylmethyl groups can be introduced into saccharose per each molecule. The proportion of sulfurous acid or any derivative thereof needed is 1 mol to each mol of a monosaccharide. With polysaccharides up to 1 mol of sulfite can be used to each basic molecule.

Instead of the pure sugars and their derivatives, there may also be used industrial raw materials containing sugar, such as starch syrup, wood saccharification products and molasses.

I have also found that the condensation products described above can be further reacted in an acid, neutral or alkaline medium with compounds containing reactive hydrogen atoms, for example, monohydric or polyhydric phenols, chlorinated and/or nitrated phenols, naphthols, hydroxyaryl carboxylic acids, aryl sulfones or sulfonamides, urea, phenol-aldehyde condensation products or phenol sulfur resins whereby condensations take place with the splitting off of water between the carbinol groups of the above described condensation products and reactive hydrogen atoms of the added compounds. Suitable compounds containing reactive hydrogen atoms are, for example, phenol, cresol, resorcinol, pyrocatechol, salicylic acid, dihydroxydiphenyldimethylmethane, dihydroxydiphenyl sulfone, beta-naphthol, dihydroxydinaphthylmethane, sulfanilamide and urea. Condensation products, functional derivatives or substitution products of the latter compounds except their sulfonic acids, may also be used as compounds containing reactive hydrogen atoms, as for example, hydroxyethylated phenols and naphthols, phenol sulfur, resins, phenol formaldehyde resins, chlorphenols or nitrophenols. The phenolic compounds are the preferred reactants.

The reaction of the carbinol groups with the condensable organic compounds takes place the more readily, the greater the number of hydrogen atoms of the sugar molecule which have been replaced by the hydroxyarylmethyl groups.

For example, for the condensation product of d-glucose according to Formula I$a$, there is obtained by reaction with 6 mols of phenol in alkaline solution a water-soluble salt of the following sulfonic acid, R being a hydroxy phenyl group:

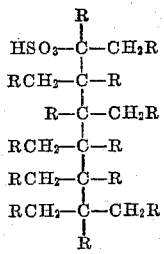

In suitable cases, for example in the case of formose, the carbinol groups may also be reacted, with the splitting off of water, with phenol alcohols, the free alcohol groups of which may then again be condensed with phenols, so that for example into formose of a mean molecular weight of 90, up to 10 hydroxyl phenyl radicals can be introduced, a product having good solubility in water being obtained.

Each of the above-described reactions, the initial carbohydrate condensation and the subsequent reaction with a compound having a reactive hydrogen atom, is preferably carried out at elevated temperatures, and the most advantageous temperature in both stages of the process lies generally speaking between 60° and 100° C.

When alcoholic hydroxyl groups are still present in the products thus obtained, they may be esterified with organic or inorganic acids, acylated, etherified (for example with monohydric or polyhydric alcohols, polyglycols, polyglycerines or phenols), reacted with alkylene oxides or be subjected to other functional modifications, as for example glucoside formation.

The water-soluble compounds obtained according to the invention are for the most part also well soluble in alcohol and, by reason of their high molecular size, have a pronounced colloidal character, so that they are more or less sensitive to electrolytes and may therefore be readily salted out if desired and thus obtained in a solid form. Ash-free products are obtained when ammonium sulfite and saccharides are reacted with phenol alcohols or phenol aldehyde resins if the phenol alcohols and phenol resins, after their production, have been separated from the salt-containing mother liquor which results in neutralization.

The new compounds and their conversion products have a great variety of uses in industry, as for example as tanning agents, as initial materials and intermediates for dyestuffs, as substitutes for tannin, and for a great variety of purposes in the textile industries, such as reserving wool and formation of colour lakes. They are also suitable for the preparation of disinfectants and preserving agents, and also of chemotherapeutic preparations.

The following examples will further illustrate the invention, but the invention is not restricted to these examples. The parts are by weight unless otherwise specified.

Example 1

A solution of 200 parts of d-glucose in 200 parts of water is allowed to flow at 50° C. into a solution of 104 parts of sodium bisulfite in 130 parts of water.

A mixture of 409.6 parts of a mixture of cresol and phenol approximately in the ratio 60:40, 10 parts of caustic soda dissolved in 15 parts of water is heated, after the addition of 400 parts of 30 percent formaldehyde solution, while stirring under reflux for an hour at 70° C. and for a further 5 hours at 80° C.

The oily-aqueous cresol-phenol-formaldehyde condensation product is then allowed to flow into the glucose bisulfite solution and the whole is heated while stirring at 90° C. until a sample withdrawn and diluted with water and acidified with glacial acetic acid yields a completely clear solution. This is the case after from 1½ to 2 hours.

The reaction product is adjusted to the pH range of 3.5 to 4.5 with glacial acetic acid and is well suited as a tanning agent.

Example 2

A mixture of 716.8 parts of a mixture of cresol and phenol in the ratio 60:40 with 17.5 parts of caustic soda dissolved in 25 parts of water is heated, after the addition of 700 parts of 30 percent formaldehyde solution, for 1 hour at 70° C. and for 5 hours at 80° C. while stirring.

The cresol-phenyl-formaldehyde condensation product is then allowed to flow into a glucose bisulfite solution prepared as described in Example 1 and the whole is heated while stirring at 90° C. until a sample withdrawn and diluted with water and acidified with glacial acetic acid yields in completely clear solution; this is the case after from 2 to 3 hours.

The condensation product is precipitated after acidification with glacial acetic acid as a resin which is readily soluble in water and in alcohol.

The product has the following formula:

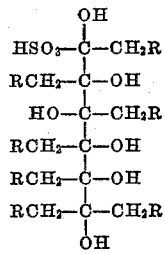

Example 3

After a condensation product prepared from 1 mol of glucose bisulfite compound and 7 mols of cresol-phenol-formaldehyde resin oil according to Example 2 has been cooled to 50° C., 614.4 parts of cresol-phenol mixture (6 mols) are added and the whole heated while stirring for 1 hour at 80° C. and then for 2 hours at 90° C.

A product which is soluble to give a completely clear solution in water is obtained. After adjustment to a pH range of 4 to 4.5 with glacial acetic acid, it is well suited, for example, for preserving fishing nets.

The product has the following formula:

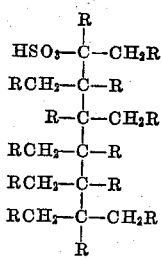

Example 4

90 parts of formose having a mean molecular weight of 90 are added to a solution of 104 parts of powdered sodium bisulfite in 130 parts of water at 50° C.

A mixture of 614.4 parts of 60:40 mixture of cresol and phenol and 15 parts of caustic soda dissolved in 25 parts of water is heated while stirring, after the addition of 600 parts of 30 percent formaldehyde solution, for 1 hour at 70° C. and then for 5 hours at 80° C.

The cresol-phenol-formaldehyde condensation product is then allowed to flow into the formose bisulfite solution and the whole is heated for about 2 hours at 90° C. until a sample diluted with cold water and acidified with glacial acetic acid yields a completely clear solution.

The product obtained, which is also soluble in alcohol, is well suited for example as a precipitant for basic dyestuffs.

Example 5

A cresol-phenol-formaldehyde condensation product from 7 mols of cresol-phenol mixture is prepared according to Example 2 and it is allowed to flow at 50° C. into a formose-sodium bisulfite solution prepared from 1 mol of formose according to Example 4. The mixture is then heated at 90° C. while stirring until, after about 2 hours, a sample yields after dilution with water a completely clear solution. 307.2 parts of a 60:40 mixture of cresol and phenol (3 mol) are then added to the condensation product at 50° C. and the whole is then heated for an hour at 80° C. and for another hour at 90° C.

There is formed a condensation product which is soluble in cold water to give a completely clear solution and which, like the product obtained according to Example 4, has a good solubility in alcohol. It may be used as a substitute for tannin or for the preparation of color lakes.

Example 6

A solution of 342.2 parts of saccharose in 450 parts of water is allowed to flow at 50° C. into a solution of 198 parts of ammonium bisulfite in 180 parts of water.

A mixture of 1024 parts of a 60:40 mixture of cresol and phenol and 25 parts of caustic soda dissolved in 35 parts of water is heated, after the addition of 1000 parts of 30 percent formaldehyde solution, for 1 hour at 70° C. and for 5 hours at 80° C.

The cresol-phenol-formaldehyde condensation product is then allowed to flow into the saccharose-ammonium bisulfite solution and the whole is heated while stirring for about 2 hours at 90° C. until a condensation product is obtained which is soluble in water to give a clear solution.

After acidification with glacial acetic acid to the pH range of 3.5 to 4.5, the product is obtained as a resin which is soluble in water and alcohol. It is well suited as a preserving agent.

Example 7

A solution of 342.2 parts of saccharose in 450 parts of water is allowed to flow at 50° C. into a solution of 208 parts of powdered sodium bisulfite in 260 parts of water.

A mixture of 1433.6 parts of a 60:40 mixture of cresol and phenol and 35 parts of caustic soda dissolved in 50 parts of water, is heated, after the addition of 1400 parts of 30 percent formaldehyde solution, for 1 hour at 70° C. and for 5 hours at 80° C.

The cresol-phenol-formaldehyde condensation product is then allowed to flow into the saccharose-bisulfite solution and the whole is heated at 90° C. until a reaction product is obtained which dissolves in water to give a completely clear solution; this is the case after 1 to 1½ hours.

The preparation, which is soluble in alcohol, is suitable for the same purposes as the products of Examples 4 to 6.

Example 8

A solution of 342.2 parts of saccharose in 450 parts of water is allowed to flow at 50° C. into a solution of 208 parts of powdered sodium bisulfite in 260 parts of water.

A mixture of 921.6 parts of cresol-phenol mixture and 22.5 parts of caustic soda dissolved in 30 parts of water is heated, after the addition of 900 parts of 30 percent formaldehyde solution, for 1 hour at 70° C. and then for 5 hours at 80° C.

The cresol-phenol-formaldehyde condensation product is then allowed to flow into the saccharose-bisulfite solution and the whole heated at 90° C. until, after about 1½ hours, a reaction product is obtained which dissolves in water to give a completely clear solution.

642.5 parts of ortho-chlorphenol and 22.5 parts of caustic soda dissolved in 30 parts of water are then allowed to flow in at 50° C. and the whole is heated for 1 hour at 80° C. and for a further hour at 90° C.

The condensation product, which dissolves in water to give a clear solution, is adjusted to a pH value of 6 with glacial acetic acid. It has a good bactericidal and preserving action.

Example 9

After a condensation product prepared according to Example 1 from 1 mol of glucose-bisulfite compound and 5 mols of cresol-phenol-formaldehyde resin oil has been cooled to 25° C., 1264.75 parts of 4.6-dinitro-2.5-dichlorophenol (5 mols), 1000 parts of water and 250 parts of caustic soda dissolved in 300 parts of water are added. The reaction temperature rises in a short time to about 55° C. The whole is heated further for about half an hour at 60° C. The condensation product, when diluted with water and acidified with acetic acid, gives a clear solution and has a strong bactericidal action.

Example 10

40 parts of a 50% sodium hydroxide solution, 376 parts of phenol and 400 parts of a 30% aqueous formaldehyde solution are added to a solution of 104 parts of powdered sodium-bisulfite and 200 parts of d-glucose in 190 parts of water while stirring. The reaction mixture is heated 1 hour at 70° C., then 5 hours at 80° C. and finally about 4 hours at 95° C. to 100° C. until a sample is fully soluble upon dilution with more water. Then 172 parts of p-aminobenzene sulfonic acid amide are added at a temperature between 40° and 50° C. The mixture is again heated about 1 hour at 80° C. and 1 hour at 90° C. until a sample diluted with water and acidified with acetic acid remains clear.

The reaction mixture is then brought to a pH of 4.5 to 5.0 by addition of acetic acid. It gives a strong precipitation with gelatine solutions and can be used for tanning and other purposes.

As will be apparent from the foregoing examples, the preferred compositions contemplated by this invention are prepared by condensing sugar and sulfurous acid or its water-soluble salts in a molar ratio of about 1:1 to 1:2, respectively. In the formaldehyde-phenol condensation with the sugar, the molar ratio of the sugar to the phenol is about 1:4 to 1:14, respectively. The additional condensation of hydroxy aromatic compounds having a reactive hydrogen with the carbinol groups of the sugar-sulfite-formaldehyde-phenol condensation product is effected with up to six mols of the hydroxy aromatic compound per mol of the aforesaid condensation product.

I claim:

1. A process of manufacturing a water-soluble tannin-like condensation product which comprises condensing by heating to temperatures from about 50 to 100° C. in aqueous alkaline medium free from organic compounds having sulfonic acid groups a carbohydrate selected from the group consisting of natural and synthetic sugars, a compound selected from the class consisting of sulfurous acid and its water-soluble salts, formaldehyde, and a hydroxyl compound of the benzene series free from sulfonic acid groups selected from the group consisting of phenol, a lower alkyl phenol, a chloro-phenol and a nitro-chloro-phenol, the molar ratio of carbohydrate to sulfurous compound being about 1:1 to 1:2, the molar ratio carbohydrate to hydroxyl compound being about 1:4 to 1:14, respectively.

2. The process which comprises further condensing by heating in aqueous medium the product which is obtained according to claim 1 with a phenol having a reactive hydrogen wherein the carbinol groups of the product of claim 1 are reacted with the reactive hydrogens to condense the compounds at a mol ratio within the range of 1–6 mols of the phenol per mol of said product with the splitting out of water.

3. A process of manufacturing a water-soluble tannin-like condensation product which comprises condensing by heating to temperatures from 50 to 100° C. in aqueous alkaline medium free from organic compounds having sulfonic acid groups (a) the addition compound of one mol of a carbohydrate selected from the group consisting of natural and synthetic sugars, with 1 to 2 mols of a compound selected from the class consisting of sulfurous acid and its water-soluble salts and (b) a methylol phenol free from sulfonic acid groups in the molar ratio of from about 1:4 to 1:14 of (a) to (b), respectively.

4. A process according to claim 3 wherein the sugar is saccharose.

5. A process according to claim 4 wherein the phenolic constituent of the methylol phenol is a mixture of phenol and cresol.

6. A process of manufacturing a water-soluble tannin-like condensation product which comprises condensing by heating to temperatures from 50 to 100° C. in aqueous alkaline medium free from organic compounds having sulfonic acid groups one mol of (a) the addition compound of one mol of saccharose with about 2 mols of ammonium bisulfite, (b) a methylol phenol having 0–4 substituents on the aryl ring selected from the group consisting of lower alkyl, chloro, and nitro in the molar ratio of from about 1:9 to 1:14 of (a) to (b), respectively.

7. The process which comprises further condensing by heating in aqueous medium the product which is obtained according to claim 6 with a phenol having a reactive hydrogen wherein the carbinol groups of the product of claim 6 are reacted with the reactive hydrogens to condense the compounds at a mol ratio within the range of 1–6 mols of the phenol per mol of said product with the splitting out of water.

References Cited in the file of this patent

UNITED STATES PATENTS

| | | |
|---|---|---|
| 2,122,124 | Alles | June 28, 1938 |
| 2,191,737 | Alles | Feb. 27, 1940 |
| 2,387,619 | Seidel et al. | Oct. 23, 1945 |